(12) United States Patent
Gertner

(10) Patent No.: US 9,698,992 B2
(45) Date of Patent: Jul. 4, 2017

(54) METHOD FOR SIGNING ELECTRONIC DOCUMENTS WITH AN ANALOG-DIGITAL SIGNATURE WITH ADDITIONAL VERIFICATION

(71) Applicant: OBSHESTVO S OGRANICHENNOJ OTVETSTVENNOSTYU "LABORATORIYA ELANDIS", Syktyvkar (RU)

(72) Inventor: Dmitry Aleksandrovich Gertner, Syktyvkar (RU)

(73) Assignee: OBSHESTVO S OGRANICHENNOJ OTVETSTVENNOSTYU "LABORATORIYA ELANDIS", Syktyvkar (RU)

( * ) Notice: Subject to any disclaimer, the term of this patent is extended or adjusted under 35 U.S.C. 154(b) by 0 days.

(21) Appl. No.: 14/686,374

(22) Filed: Apr. 14, 2015

(65) Prior Publication Data

US 2015/0222437 A1    Aug. 6, 2015

Related U.S. Application Data

(63) Continuation of application No. PCT/RU2013/000901, filed on Oct. 11, 2013.

(30) Foreign Application Priority Data

Oct. 15, 2012   (RU) ................. 2012143920

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/36* (2013.01); *G06F 21/64* (2013.01); *H04L 63/123* (2013.01)

(58) Field of Classification Search
CPC ..... H04L 9/006; H04L 9/3236; H04L 9/3247; H04L 9/3263
See application file for complete search history.

(56) References Cited

U.S. PATENT DOCUMENTS 5,825,880 A    10/1998   Sudia et al.
6,553,494 B1    4/2003   Glass
(Continued)

FOREIGN PATENT DOCUMENTS

EP            1662699 A1        5/2006
HU   WO 2007034255 A1 *    3/2007   ........... H04L 9/3231
(Continued)

OTHER PUBLICATIONS

International Search Report PCT/RU2013/000901 dated Mar. 20, 2014.
(Continued)

*Primary Examiner* — Christopher C Harris
(74) *Attorney, Agent, or Firm* — BCF LLP

(57) ABSTRACT

There is disclosed a method of signing an electronic document. The method comprises: receiving via an encrypted connection a signature generation request file; receiving the AD information (such as dynamic autographic signature of the user) associated with a user. The method further comprises generating a first control sum based on the electronic document and a second control sum based on the AD information. The method further comprises generating a single numeric sequence based on the first and second control sums and encrypting the single numeric sequence using the private key to generate a digital signature. The method further comprises generating a final signature confirmation file including a hyperlink to the electronic document to be signed and to the AD information associated with the user; and transmitting, to the electronic address associ-
(Continued)

ated with the user, a file containing the digital signature, only in response to a conformation response from the user.

17 Claims, 2 Drawing Sheets

(51) Int. Cl.
*G06F 21/64* (2013.01)
*G06F 21/36* (2013.01)

(56) References Cited

U.S. PATENT DOCUMENTS

| | | |
|---|---|---|
| 8,112,633 B1 | 2/2012 | Clyde et al. |
| 2003/0093678 A1 | 5/2003 | Bowe et al. |
| 2003/0233557 A1* | 12/2003 | Zimmerman ........ G07C 9/0015 713/186 |
| 2005/0039018 A1* | 2/2005 | Wittkotter ............. G06F 21/602 713/176 |
| 2005/0283614 A1* | 12/2005 | Hardt ................. H04L 63/0823 713/182 |
| 2008/0098038 A1* | 4/2008 | Motoyama ........ G06F 17/30067 |
| 2010/0250953 A1* | 9/2010 | Wiersma ................. H04L 9/321 713/180 |
| 2011/0179289 A1* | 7/2011 | Guenther ................. G06F 21/32 713/189 |
| 2012/0072837 A1* | 3/2012 | Triola .................... G06Q 50/18 715/268 |
| 2012/0192250 A1* | 7/2012 | Rakan ................... H04L 9/3231 726/2 |
| 2012/0300251 A1* | 11/2012 | St. Laurent ........ H04N 1/00244 358/1.15 |
| 2013/0205386 A1* | 8/2013 | Thompson ............. G06F 21/31 726/17 |
| 2014/0240525 A1* | 8/2014 | Julia ...................... H04N 5/268 348/207.1 |

FOREIGN PATENT DOCUMENTS

| | | |
|---|---|---|
| RU | 2287223 C2 | 11/2006 |
| WO | 02091669 A1 | 11/2002 |
| WO | 2007/036763 A1 | 4/2007 |

OTHER PUBLICATIONS

Abstract in English of RU 2287223 C2.
Office Action issued by the Canadian PO with regard to the counterpart patent application No. CA 2,887,700 mailed Apr. 18, 2017.

* cited by examiner text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, text of an electronic document, stamp and sign:

10

12

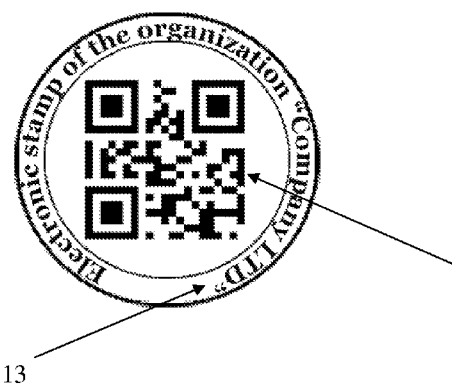

METHOD FOR SIGNING ELECTRONIC DOCUMENTS WITH AN ANALOG-DIGITAL SIGNATURE WITH ADDITIONAL VERIFICATION

CROSS-REFERENCE

The present application claims priority to Russian Patent Application No. 2012143920, filed on Oct. 15, 2012, entitled "METHOD OF SIGNING ELECTRONIC DOCUMENTS WITH ANALOGUE-DIGITAL SIGNATURE WITH ADDITIONAL VERIFICATION" the entirety of which is incorporated herein by reference and is a continuation of PCT/RU2013/000901 filed on Oct. 11, 2013, entitled "METHOD OF SIGNING ELECTRONIC DOCUMENTS WITH AN ANALOGUE-DIGITAL SIGNATURE WITH ADDITIONAL VERIFICATION".

FIELD OF THE TECHNOLOGY

The invention pertains to electronic industry, namely paper-free document management technologies and can be used for conversion of primary documentation of companies into electronic form.

BACKGROUND

Electronic Digital Signature algorithms (EDS) make it possible (i) to sign documents using a digital signature using user-defined private keys and (ii) to check authenticity of electronic digital signatures using public keys. The association between a particular public key and a particular user is verified using a digital signature of a trusted key distribution centre in the form of a digital certificate. A pair of unique keys is generated for each user—a private key and a public key of the electronic digital signature. Typically, a user is supposed to keep the private key n confidence and can use it for signing e-documents.

The disadvantages of the electronic digital signature are the requirement of use some media to reliably store the private key (as it is almost impossible to remember an individual private key due to its large size) as well as safekeeping of the media itself and the need to remember the password for the private key. Another problem is the lack of compatibility between different EDS algorithms, software and hardware, which is a significant constraint for a broader application of digital signatures. Another serious problem is a psychological bather for transition to paper-free document management technologies based on EDS.

There is a known method disclosed in a patent application entitled "Method of signing of documents with electronic AD signature and device for implementation of this method", bearing a Russian patent No. 3398334. The disclosed method allows for signing documents with AD signature without preliminary generation of personal user-defined electronic signatures. The identity of the user who signed an electronic document is verified based on the user-specific biometric data which is an integral part of the particular electronic document being signed and which cannot be used for any other electronic document of the same format.

The disadvantage of this method is low reliability. For example, if an electronic document is delivered to EDS device from a computing apparatus with pre-installed malicious software (generally known as hacker software), the malicious software can be configured to cause one document to be displayed to the user for signature and a different document actually to be signed. Thus, there remains a possibility, that the user can inadvertently sign an electronic document other than the one which is displayed on the screen and which the user believes she or he is actually signing. For this very reason, this prior art method contemplates, rather than inputting the documents for signing from a computer, but rather from auxiliary devices, such as a bar-coder, a scanning device or a digital camera, which is not a user-friendly practice because it requires the electronic document to be printed prior to EDS.

SUMMARY

According to a first broad aspect of the present technology, there is provided a method of signing an electronic document using an Analog-to-Digital (AD) signature. The method is executable at a server. The method comprises: receiving, from an electronic device, via an encrypted connection of a communication network a signature generation request file, the signature generation request file having been generated by the electronic device by executing: generating a private key; receiving the electronic document to be signed; receiving an Analog-to-Digital (AD) information associated with a user of the electronic device; generating a first control sum based on the electronic document and a second control sum based the AD information associated with the user; generating a single numeric sequence based on the first control sum and the second control sum; encrypting the single numeric sequence using the private key to generate a digital signature; generating the signature confirmation file, the signature generation request file containing at least: an electronic address associated with the user, the electronic document to be signed, the AD information associated with the user, and the digital signature; generating a final signature confirmation file; the final signature confirmation file including a hyperlink to the electronic document to be signed and to the AD information associated with the user, both the electronic document to be signed and the AD information associated with the user accessible via the server; transmitting the final signature confirmation file to the electronic address associated with the user; receiving, from the user, a confirmation response; in response to the conformation response, transmitting, to the electronic address associated with the user, a file containing the digital signature.

In some implementations of the method, if within a pre-determined period of time, the pre-determined period of time calculated from the transmitting the final confirmation file to the electronic address associated with the user, the confirmation response is not received, the method further comprises deleting the digital signature.

In some implementations of the method, the deleting the digital signature is executed without transmitting, to the electronic address associated with the user, the file containing the digital signature.

In some implementations of the method, at least one of: transmitting the final signature confirmation file; receiving, from the user, a confirmation response; and transmitting, to the electronic address associated with the user, the file containing the digital signature, is executed via the encrypted connection.

In some implementations of the method, the AD information comprises a dynamic autographic signature of the user.

In some implementations of the method, the method further comprises, prior to the receiving the signature generation request file, storing a public key of the electronic device, the electronic device being one of a plurality of trusted electronic devices, and the method further comprising using the public key to verify that the signature generation request file is received from the trusted electronic device.

In some implementations of the method, the generating the final signature confirmation file is executed only in response to a positive verification of the trusted electronic device.

In some implementations of the method, the electronic device comprises a computer and an ADS device coupled thereto, and wherein the public key is associated with the ADS device.

In some implementations of the method, the method further comprises, prior to the receiving the signature generation request file, storing a sample AD information associated with the user, the user being a trusted user, the method further comprising comparing the received AD information with the sample ID information to verify that the signature generation request file is received from the trusted user and wherein the generating the final signature confirmation file is executed only in response to a positive verification of the AD information.

In some implementations of the method, the method further comprises, prior to the receiving the signature generation request file, storing a list of electronic addresses of authorized users, the method further comprising checking whether the signature generation request file contains the electronic address that matches an entry in the list of electronic addresses, and wherein the generating the final signature confirmation file is executed only in response to a positive verification of the electronic address.

In some implementations of the method, the generating the final signature confirmation request file further comprises generating a random confirmation code, the method further comprising:

inserting the random confirmation code into the final signature confirmation file;

checking if the confirmation response contains the confirmation code.

According to another broad aspect of the present technology, there is provided an electronic device. The electronic device comprises: a processor; a memory coupled to the processor; an input-output module coupled to the processor; and a biometry entry module coupled to the processor; the memory storing computer executable instructions, which computer executable instructions when executed, cause the processor to execute: generate a private key; acquire an electronic document to be signed; acquire an electronic address associated with a user of the electronic device; acquire, via the biometry entry module, an AD information associated with the user of the electronic device; generate an Digital signature using the AD information associated with the user; generate a signature generation request file, the signature generation request file containing at least: the electronic address associated with the user, the electronic document to be signed, the AD information associated with the user, and the Digital signature; establish an encrypted connection with a server; transmit, via the encrypted connection, the signature generation request file, the signature generation request file for confirming the Digital signature via the server.

In some implementations of the electronic device, to generate the signature generation request file, the processor is configured to: generate a first control sum based on the electronic document and a second control sum based the AD information associated with the user; generate a single numeric sequence based on the first control sum and the second control sum; encrypt the single numeric sequence using the private key do generate the Digital signature.

In some implementations of the electronic device, the electronic device further comprises a protective cover enclosing the processor, the memory, the input-output module and the biometry entry module, the protective cover comprising a sensor coupled to the processor and the memory, the sensor being configure to: detect an un-authorized tempering with the protective cover; transmit a deletion command to the processor, the deletion command for erasing data stored on the memory.

In some implementations of the electronic device, the AD information comprises a dynamic autographic signature of the user and wherein the biometry entry module comprises a hand-written information input device.

In some implementations of the electronic device, the biometry entry module is coupled to the processor via a wireless connection.

In some implementations of the electronic device, the processor is further configured to execute private-public key cryptography.

In some implementations of the electronic device, the processor is further configured to: receive from the server a final signature confirmation file; the final signature confirmation file including a hyperlink to the electronic document to be signed and to the AD information associated with the user, both the electronic document to be signed and the AD information associated with the user accessible via the server; in response to the user activating the hyperlink, display on the input-output module at least one of the electronic document and the AD information; acquire, from the user, a confirmation response; transmit the confirmation response to the server; receive a file containing the Digital signature; store, in the memory, the Digital signature.

In some implementations of the electronic device, the processor and the biometry entry module are parts of separate physical entities.

BRIEF DESCRIPTION OF THE DRAWINGS

FIG. 2 depicts an example of a print version of a document generated by the system of FIG. 1.

DESCRIPTION OF INVENTION

Figure 1:
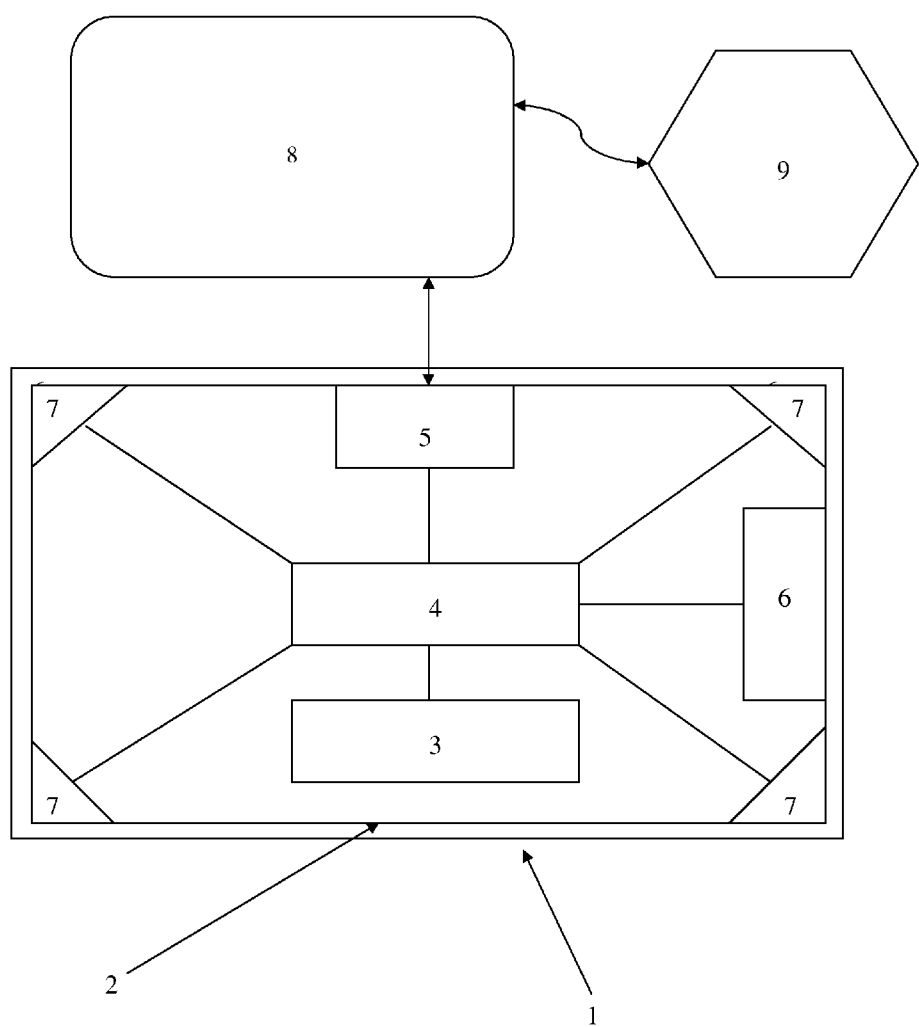
FIG. 1 depicts a system implemented in accordance with non-limiting embodiments of the present technology.

This invention is aimed at providing a new method of e-documents signing using a signature with an additional verification, which will eliminate the above mentioned vulnerability and will allow direct entry of the electronic documents from a computing apparatus to an Analog-to-Digital Signature (ADS) device.

This above goal is achieved by developing a special configuration of an ADS device 1 (FIG. 1). As depicted in FIG. 1, the ADS device 1 comprises: a protective housing 2 that contains: a memory data storage 3, a microprocessor 4, at least one input and output port 5, and a device for entering biometric data 6. Memory data storage 3 contains a private key and computer executable instructions for implementing the algorithms of CRC computation and electronic digital signature. The protective housing 2 contains an anti-tamper switch 7 which is communicatively coupled to the microprocessor 4 and the memory data storage 3. If the protective housing 2 is damaged, data stores in the memory storage 3 is erased. Microprocessor 4 is linked with the memory data storage 3 by means of a data input and output port 5 (hereinafter referred to as "the port" or "I/O port") and a biometry data input device 6 that is configured to process data and to output the processed data via the port 5 to a computer 8. There is also provided a server 9, which is used as for implementing the method as will be described herein below. The server 9 is configured to execute verification and is connected to a communication network. The computer 8 is linked with server 9 via a communication network. ADS device 1 is connected via port 5 to the computer 8. The user's email can be entered into the ADS device 1. The signature confirmation request file is generated by the ADS device 1. This request includes such information as the user's email, the electronic document, the analogue-digital information about the user and the obtained digital signature. The encrypted connection is established between the ADS device 1 and a server 9. The server 9 is designed to ensure verification and the signature confirmation file is transmitted to the server 9. The above mentioned server 9 generates and sends via the communication network to the user's email, a final confirmation file containing a request for confirmation of the signature, the final confirmation file includes the electronic document file and a file with the AD information about user. Thus, user can again check documents that was signed and confirm or cancel the signing of the electronic document. In case of confirmation of the signature—the server 9 receives a positive response and the server 9 sends back the file containing the mentioned digital signature to the user's email. If user does not send confirmation within a certain time limit, the digital signatures will not be sent from the server 9 and will eventually be deleted. Digital signature is also deleted before the set time if the user, during the signature verification process, selects a proposed option "cancel signature". If the confirmation is received after the set time limit, the confirmation will be ignored. Thus, if signing the electronic document is not confirmed by the user, no party will receive the digital signature linking AD information associated with the user with the electronic document being signed and it will be permanently deleted form memory data storage of the server 9.

Biometry data input device 6 is designed for entering AD information about user signing the document. The AD information is actually a biometric data which is unique for each user. Information about dynamic and trajectory of a personal user signature can be used as such biometric data. Hand-written information input device such as a laser marker (Patent Application No. 3013103309/09(004133)) can be used as the biometric data input device 6 for appropriate type of biometry information. Its distinctive feature is that the laser marker as user biometry information input device is linked with the ADS device 1 by a wireless optical communication channel.

Port 5 is connected to the computer 8 that is used to generate and/or to save electronic documents for signing. Additionally, part of complex computing operations with of the microprocessor 4 can be performed by microprocessor of the computer 8. Computer 8 is used to establish a link with communication network, namely with the Internet, to which server 9 is connected, which server 9 is designed for verification of signed electronic documents. Users can access the server 9 via the communication network, namely the Internet, using their terminal devices such as a personal computer (PC), smartphones for signature verification. Users are identified using their unique electronic addresses such as emails. Thus, the user can sign electronic document using one PC to which the ADS device is connected and the signature can be confirmed by any other terminal device such as another PC, smart phone, etc. The ADS device 1 is not needed for confirmation of the signature.

Before detailed description of the invention we need to explain used terminology.

Verification in this description means a check, a method of confirmation, a check using additional actions of the user.

A user account means an account that contains information required for user identification in case of logging in into the system, information for authorization and accounting. This is a user name and password (or other similar means of authentication, for example, biometry characteristics). Password or its equivalent is saved in the encoded or hashed form (to ensure its security). User account can also record different user statistics in the system: the date of last system logging in, duration of work in the system last time, address of computer used to log in, system usage intensity, total and (or) specific number of certain operations performed in the system and so on.

Hyperlink is a part of an electronic document including email that is linked to other element (command, text, header, note, image) in the document, other object (file, catalogue, annex) stored in the local drive or in a computer network, linked to the element of this object. Hyperlink can be added to any element of the electronic document and is usually graphically identified.

Identification means procedure of recognition of the subject at its address, namely, using the user's email or a mobile phone number.

Server means a computer dedicated and/or specializing for performance of certain service functions.

Using AD signature with additional verification for signing electronic documents can be implemented as follows. User can see an electronic document on the screen of the computer 8. User ensures that ADS device 1 is connected to the computer 8 and the latter is connected to the communication network such as the Internet to which server 9 is connected. Then the user enters his or her AD information using the biometry data input device 6. Laser pen can be used as such biometry data input device 6. User puts his or her personal signature using the laser pen in the selected field on the screen of the computer 8 (in this case dynamic autographic signature contains AD information about the user). This field is generated by the software and can be located on top of the e-document image. A second field can be located near the autographic signature field for the user's email which is unique for each user. Dynamic autographic signature is entered via the biometry data input device 6 as AD information associated with the user. It is digitized using the microprocessor 4 and is stored in the memory data storage 3. Simultaneously a digitized dynamic autographic signature is delivered via the port 5 to computer 8 and using software it is displayed on the screen of the monitor in the form of trajectory of the electronic signature. The computer 8 software allows for displaying the trajectory on the screen synchronously with the movement of the biometry data input device 6 such as the above-mentioned laser marker. This creates an illusion of drawing on the screen. When the user enters personal AD information, as well as entered his or her email—the following happens. Electronic document file and the information about the user's email address is entered into the ADS device 1 via the port 5 from the computer 8. Email address can be entered separately from the electronic document. Email address can also be retrieved by the software of the computer 8 directly from the electronic document if the email address is located at the end of the text part of the electronic document or the email address is highlighted by special predefined tagging elements—tags. Email address, mobile phone number or any other unique address can be used as an electronic address. If mobile phone number is used as an electronic address, the request file is sent to the mobile phone in the form of SMS.

Then, the microprocessor 4 and the software stored in the memory data storage 3 generate a first control sum based on the AD information associated with the user and a second control sum based on the electronic document and the two control sums are used to generate a single numeric sequence and using a private key and the software stored in the memory data storage 3, the single numeric sequence of the electronic digital signature is generated.

Then, using software stored in memory data storage 3, a request file is generated for confirmation of the signature, which request file includes the user electronic address, the electronic document, the digitized AD information associated with the user and the generated electronic digital signature. Then using the software stored in the memory data storage 3 via the port 5 and via the communication network, an encrypted connection is established with the server 9. A conventional cryptographic protocol is used which is based on the exchange of public keys of the ADS device 1 and the server 9. The public key of the ADS device 1 is stored in the memory data storage of the server 9 for enabling the server 9 to identify the ADS device 1 and to establish the encrypted connection with the authenticated ADS device 1. Therefore, the public key of the server 9 is also stored in the ADS device 1.

It is also possible, in some embodiments, to generate digital certificates for public keys of the ADS device 1 and the server 9. In this case, a main private key and a main public key is generated. Main public key is saved on the server 9 and on the ADS devices 1. Digital certificates of public keys of the ADS device 1 and the server 9 are created using the main private key. The ADS device 1 is identified by the server 9 using these digital certificates. Server 9 is identified by the ADS device 1 using digital certificate of the server 9. It should be noted that it is necessary to preinstall server software supporting known cryptographic protocols for verification of digital certificates and for establishing encrypted links with the identified ADS device 1.

After establishing the encrypted link between the ADS device 1 and the server 9, the ADS device 1 sends the request file for confirmation of the signature. This confirmation file contains the user electronic address, the obtained electronic document, the digitized AD information associated with the user and the received digital signature. Then, the server 9 retrieves the electronic address of the user, the digital signature from signature confirmation request file. The signature is saved in the memory data storage of the server 9 and the final file requesting confirmation of the signature is generated. This file includes the file of electronic document and file with AD information about user. The final signature confirmation request file is sent via the communication network to the user electronic address. At the same time as the sending of the confirmation request file, the confirmation waiting time is set. Time range is set in advance. If the user's electronic address is an email address, the user receives an email containing a hyperlink to the signed electronic document and to the AD information about the user who signed the document. Then, the user opens an html page of the server 9 using the hyperlink where he/she can review the electronic document. If the user confirms the signature by sending a confirmation reply—which can be provided by clicking an html confirmation button—the file containing the digital signature is sent to the electronic address of the user. If, within the predefined time, the user does not send the confirmation or if the user clicks a signature rejection html button, the file containing the digital signature is deleted in the server 9.

In some embodiments of the invention, the following alternative variants can be implemented.

At least two private keys of digital signature are generated and saved on the ADS device 1. The first private key is used for creation of digital signatures for legal electronic documents such as contracts, invoices, certificates, orders, resolutions, etc. and the second private key is used for generation of digital signatures of other electronic documents such as receipts, small fines, applications, etc. The private key for generation of the digital signature will be selected in the ADS device 1 using the following procedure: when electronic user address is received via the port 5 for verification, the first private key of digital signature is used for signing and in case of the absence of the electronic user address the second private key of digital signature is used. Therefore, if the electronic document is signed by the second private key the verification via sever 9 can be omitted. Additionally, the software installed on the computer 8 to which the ADS device 1 is connected can be used for authentication of trusted users by comparison of the AD information associated with the user entered via the biometry data input device 6 with pre-saved samples of AD information of trusted users such as samples of dynamic autographic signatures. Samples of AD information of trusted users can be stored in the databases in the mentioned computer 8 or the server 9. Prior to generating the electronic signature, the ADS device 1 connects to the software and transmits thereto the user electronic address and the AD information just created by the user and entered via the biometry data input device 6. Software connects to he database with samples of AD information of trusted users and transmits the electronic address of the user. If the database contains such electronic address and the sample of the AD information of the user in question, the AD information received from the ADS device 1 and the one stored in the database are compared. In case of close similarity the authentication is considered to be successful and the first private key of the digital signature is used in the ADS device 1 for signing. For protection of the database from entry of false data the stored database data is encrypted using known data security methods.

There is another possible method of providing access to the ADS device 1 for trusted users: A list of electronic addresses of trusted users associated with the certain ADS devices 1 is saved on the server 9. When signature confirmation request file is received from the ADS device 1, the signature confirmation request file is checked using the public key for any potential restrictions set for accessing this ADS device 1. If a restriction has been put in place, it is checked whether the received request contains the electronic address of the user included in the mentioned list—if it is so the verification is continued.

When final signature confirmation request file is created on the server 9, a random confirmation code is generated. It is included in the final signature confirmation request file as a hyperlink. Confirmation code is saved in the memory data storage of the server 9. When the confirmation response is received from the user, the confirmation code is checked and compared with the code saved in the memory data storage of the server 9. Verification is continued only if the code matches. Final confirmation of the signature is performed by the user using the html page of the server 9. Hyperlink contained in the final signature confirmation request file is linked with this html page. Html page contains additional elements of the interface such as: a link for downloading the electronic document, a link to the AD information associated with the user signing the document, html buttons for confirmation and rejection of the signature.

The server 9 is further configured to execute registration of users. In this case the account and the electronic address of the user are saved on the server 9. In this case, when the user is connected to the sever 9 via an electronic device the user is identified using the user electronic address, i.e. the electronic address used as login for identification of the account of the user that is saved in the database of the server 9. Additionally the access to the account can be protected by a password and when the server 9 receives confirmation from the user, an additional authorization of user is performed for final verification of the signature using password and data from user account.

It is possible to use several servers 9 as an option for verification. These servers 9 can be connected to the communication network. This implementation can be useful when a given organization needs, for security reasons or otherwise, their own sever 9 to store samples of the AD information of employees of that given organization. If several servers 9 are used, the user account and electronic address are stored on one of these servers 9. Routers connected to the communication network are used to determine which server 9 should be used. Software routers installed on each server 9 and hardware routers can be used. Lists of electronic addresses of users are copied on each router with indication of server 9 where the data of indicated user is stored. Additionally, the unique private key of each user is stored on each server 9. Digital certificates of the servers 9 for their public keys are created using mentioned main private key. These public keys are pairs of respective private keys. Main public key which is a pair of main private key is saved on all ADS devices 1 and software is installed for verification of digital certificates of servers 9. Only after successful validation of digital certificate of the server 9, the encrypted connection is established therewith.

Additionally, the account of the given user can contain a sample of the AD information associated with the given user. In this case the sample is transmitted from the ADS devices 1 and saved on the server 9 together with data of the registered user to which the sample of the AD information belongs, namely the sample of the dynamic autographic signature. For other users to be able to verify that the sample of the AD information associated with the user indeed belongs to this user, the sample is additionally signed by the digital signature of the device whose public key or digital certificate is stored in the server 9 in the list of trusted devices. Such trusted ADS devices 1 can include devices that officially belong to such organizations as notaries, passport offices, certification centres, etc. Signing of the sample of the AD information associated with the user in this case is performed via one of trusted ADS devices 1 and then it is transmitted to the server 9.

For security reasons samples of the AD information associated with users is stored in server 9 in an encrypted form. Electronic address of the user whose sample is encrypted is used as an encryption key. In this case, the electronic addresses in the open form are not saved in the server database, only control sums of the electronic addresses are saved. Control sums are calculated using hash functions and appropriate software.

Many electronic documents require signatures of two and more persons for such multilateral signing of electronic document several digital signatures are generated, one for each AD information associated with each respective user who signs the electronic document. The electronic document in this case can be signed on the same and on different ADS devices 1.

In case of multilateral signing of electronic document using different ADS devices 1 this process is coordinated via the server 9 for users to sign the same electronic document or to enable access to the electronic document signed by different users via the same hyperlink Signed electronic document is saved on the server 9 and a hyperlink to the html page of the server 9 is created. This html page contains a link to the electronic document, files containing data and analogue-digital information associated with the users who sign this electronic document and links to accessible digital signature files, i.e. digital signatures which are confirmed by users. The links to the samples of their AD information namely samples of dynamic autographic signature for other users who sign this electronic document to be able to visually identify the similarity or difference. Additionally, it is possible to provide access rights to this html-page, for example, full access for users for users participating in the signing of this electronic document. These user rights are determined automatically using electronic addresses of users indicated in electronic document. If the hyperlink is used by an external user he/she will see limited amount of information in the html-page, e.g. only the electronic document or electronic document and data of signatories who confirmed their signatures. User who was the first to upload the electronic document to server 9 can manage access rights.

If the user needs to print signed electronic document a print version of the document is generated that includes the text of this electronic document 10 (FIG. 2) and a 2D code 11 is generated such as QR code that contains information about the hyperlink to the html page on the server 9 and it is included in the print version of the document. Thus, it will be sufficient to take a picture of 2D code 11 from the printed document by a smartphone supporting conversion of the image into a hyperlink and then open desired html page on the server 9 where this electronic document is stored with all signatures and data of users who signed this electronic document. Also, for convenience purpose the software can be used for inserting into the print version of the document, a mask 12 of the AD information associated with the user, namely, the image of the user's dynamic autographic signature. Additionally, in proximity to the 2D code 11, namely QR code, a visual element 13 can be inserted. The visual element 13 can include text, such name and type of ownership of organization that owns the ADS device 1 used to sign this electronic document.

Generally the invention can be realized in practice using known technologies and cryptographic algorithms such as digital signature algorithms and asymmetric coding using elliptical functions. Although this invention can be described using the example of several variants, those of skill in the will be able to contemplate other variants and embodiments without exceeding the limits of the essence and scope of the invention. For this reason the invention is bound only by the claims appended hereto.

The invention claimed is:

1. A method of signing an electronic document using an Analog-to-Digital (AD) information, the method executable at a server, the method comprising:
  receiving, from an electronic device, via an encrypted connection of a communication network a signature generation request file, the signature generation request file having been generated by the electronic device by executing:
  generating a private key;

receiving the electronic document to be signed;
receiving an AD information associated with a user of the electronic device, the AD information including at least a digital representation of a user autograph, the digital representation allowing reproduction of a trajectory of movement when the user produced the autograph;
applying at least one hash function to generate a first control sum based on the electronic document and a second control sum based the AD information associated with the user;
generating a single numeric sequence based on the first control sum and the second control sum;
encrypting the single numeric sequence using the private key to generate a digital signature;
generating the signature generation request file, the signature generation request file containing at least:
an electronic address associated with the user,
the electronic document to be signed,
the AD information associated with the user, and
the digital signature;
generating a final signature confirmation file; the final signature confirmation file including a hyperlink to the electronic document to be signed and to the AD information associated with the user, both the electronic document to be signed and the AD information associated with the user accessible via the server via a hyperlink included in the final signature confirmation file, the final signature confirmation file being without the digital signature;
transmitting the final signature confirmation file to the electronic address associated with the user;
storing an encrypted digital signature file for a pre-determined period of time;
executing one of:
in response to receiving a request confirmation from the user within said pre-determined period of time, sending via the communication network to the user's electronic address said digital signature; and
in response to not receiving the request confirmation within said pre-determined period of time, not sending said digital signature and deleting said digital signature from the server;
prior to the receiving the signature generation request file, storing a sample AD information associated with the user, the user being a trusted user;
comparing the received AD information with the sample AD information to verify that the signature generation request file is received from the trusted user; and
wherein the generating the final signature confirmation file is executed only in response to a positive verification of the AD information.

2. The method of claim 1, wherein the pre-determined period of time calculated from the transmitting the final confirmation file to the electronic address associated with the user.

3. The method of claim 1, wherein at least one of:
transmitting the final signature confirmation file;
receiving, from the user, a confirmation response; and
transmitting, to the electronic address associated with the user, the file containing the digital signature,
is executed via the encrypted connection.

4. The method of claim 1, further comprising, prior to the receiving the signature generation request file, storing a public key of the electronic device, the electronic device being one of a plurality of trusted electronic devices, and the method further comprising using the public key to verify that the signature generation request file is received from the trusted electronic device.

5. The method of claim 4, wherein the generating the final signature confirmation file is executed only in response to a positive verification of the trusted electronic device.

6. The method of claim 4, wherein the electronic device comprises a computer and an Analog-to-Digital Signature (ADS) device coupled thereto, and wherein the public key is associated with the ADS device.

7. The method of claim 1, further comprising, prior to the receiving the signature generation request file, storing a list of electronic addresses of authorized users, the method further comprising checking whether the signature generation request file contains the electronic address that matches an entry in the list of electronic addresses, and wherein the generating the final signature confirmation file is executed only in response to a positive verification of the electronic address.

8. The method of claim 1, generating the final signature confirmation request file further comprises generating a random confirmation code, the method further comprising:
inserting the random confirmation code into the final signature confirmation file; and
checking if the confirmation response contains the confirmation code.

9. A system for electronic documents signature using an analogue to digital Analog-to-Digital (AD) signature with additional verification, the system comprising:
a server for AD signature verification, wherein said server comprises a digital certificate; and
at least one Analog-to-Digital Signature (ADS) electronic device for AD documents signing, wherein said server and said ADS electronic device are connected via a computer device and a communication network,
the server being configured to:
identify the ADS device using said digital certificate of the said ADS device;
establish an encrypted connection with said ADS device;
receive from said ADS device a signature confirmation request file, said signature confirmation request file including:
at least an electronic document,
an indication of an electronic address associated with a user,
user AD information containing dynamic and trajectory features of a personal user signature, and
a digital signature;
generate a hyperlink to the electronic document to be signed and to the user AD information associated with the user;
generate and send via the communication network to the user's electronic address a final signature confirmation file, said final signature confirmation file including said hyperlink without the digital signature;
store an encrypted digital signature file for a pre-determined period of time; and
to execute one of:
sending via the communication network to the user's electronic address said digital signature if a request confirmation is received from the user within said pre-determined period of time; and
deleting said digital signature from the server if said request confirmation is not received within said pre-determined period of time;

prior to the receiving the signature confirmation request file, store a sample AD information associated with the user, the user being a trusted user;

compare the received user AD information with the sample AD information to verify that the signature confirmation request file is received from the trusted user; and wherein the generating the final signature confirmation file is executed only in response to a positive verification of the AD information.

10. The system of claim 9, the server is being further configured to generate main private key and a main public key, wherein said main public key is a pair of main private key, wherein said main public keys is stored on the ADS device and digital certificates for their public keys are created using mentioned main private key, and wherein ADS devices verification on the server is enabled by using said digital certificates.

11. The system of claim 9, wherein the server is further configured to store a list of electronic addresses of an authorized user associated with the ADS device and wherein the server is further configured, responsive to the receipts of the signature confirmation request file, to check the signature confirmation request file using the public key to determine whether the received request contains the electronic address of the user is the authorized user.

12. The system of claim 9, wherein the server is further configured to save the account and the electronic address of the user and when the user connects to the server via a computer device, said user is identified using said stored electronic address.

13. The system of claim 9, wherein the server comprises a plurality of servers for executing a verification process and wherein the plurality of servers are connected to the communication network, and wherein the user account and electronic address are stored on one of the plurality of servers and wherein the system further comprises routers connected to the communication network to determine which server of the plurality of servers should be used for access to said user's electronic address and user account.

14. The system of claim 9, wherein the user account further contains a sample of the AD information associated with said user, and wherein the server is configured to receive the sample from the ADS device.

15. The system of claim 14, wherein the sample is additionally signed by the digital signature of the device whose public key or digital certificate is stored in the server in a list of trusted devices.

16. The system of claim 9, wherein the server is further configured to generate an html page, said html page for verification, said page being addressable by the hyperlink contained in the final signature confirmation request file, and wherein said html page contains interface elements for confirming or rejecting of the signature.

17. The system of claim 9, wherein upon receipt of the confirmation from the user, the server is further configured to perform an additional authorization of the user for final verification of the signature using data from the user account, stored on the server.

\* \* \* \* \*